United States Patent
Gauthier et al.

(10) Patent No.: US 8,959,769 B2
(45) Date of Patent: Feb. 24, 2015

(54) METHOD AND APPARATUS FOR HEAT RECOVERY WITHIN A SYNGAS COOLER

(75) Inventors: Robert Henri Gauthier, Houston, TX (US); James Michael Storey, Houston, TX (US); Yasir Hafeez Abbasi, Houston, TX (US)

(73) Assignee: General Electric Company, Schenectady, NY (US)

(*) Notice: Subject to any disclaimer, the term of this patent is extended or adjusted under 35 U.S.C. 154(b) by 940 days.

(21) Appl. No.: 11/828,785

(22) Filed: Jul. 26, 2007

(65) Prior Publication Data

US 2009/0025917 A1    Jan. 29, 2009

(51) Int. Cl.
| | |
|---|---|
| F28F 9/22 | (2006.01) |
| F28D 7/16 | (2006.01) |
| F28D 7/00 | (2006.01) |
| C10J 3/86 | (2006.01) |
| F01K 23/06 | (2006.01) |
| F28F 9/02 | (2006.01) |
| F28D 21/00 | (2006.01) |

(52) U.S. Cl.
CPC ............. *F28D 7/0041* (2013.01); *C10J 3/86* (2013.01); *C10J 2300/0959* (2013.01); *C10J 2300/0973* (2013.01); *C10J 2300/0996* (2013.01); *C10J 2300/165* (2013.01); *C10J 2300/1671* (2013.01); *C10J 2300/1675* (2013.01); *C10J 2300/1678* (2013.01); *C10J 2300/1838* (2013.01); *C10J 2300/1884* (2013.01); *F01K 23/068* (2013.01); *F28D 2021/0075* (2013.01); *F28F 9/02* (2013.01); *Y02E 20/18* (2013.01)
USPC .......... 29/890.03; 122/7 R; 165/145; 165/157; 422/200; 422/202

(58) Field of Classification Search
USPC ........... 165/145, 157; 422/200, 202; 122/7 R; 29/890.03
See application file for complete search history.

(56) References Cited

U.S. PATENT DOCUMENTS

| | | | | |
|---|---|---|---|---|
| 2,508,247 | A | * | 5/1950 | Giauque ................... 165/163 |
| 2,640,686 | A | * | 6/1953 | Brown, Jr. ................ 165/145 |
| 2,862,480 | A | | 12/1958 | Oberg |
| 2,973,944 | A | * | 3/1961 | Etter ......................... 165/145 |
| 2,990,162 | A | * | 6/1961 | Otten ....................... 165/145 |
| 3,053,512 | A | * | 9/1962 | Soudan et al. ............ 165/145 |
| 3,116,790 | A | * | 1/1964 | Walter ...................... 165/163 |
| 3,590,540 | A | * | 7/1971 | Johnson et al. ........... 52/309.13 |
| 3,765,664 | A | * | 10/1973 | Ojima et al. .............. 266/280 |
| 4,372,253 | A | * | 2/1983 | Hibbel et al. ............. 122/7 R |

(Continued)

FOREIGN PATENT DOCUMENTS

| | | |
|---|---|---|
| GB | 2061758 | 5/1981 |
| WO | 9110106 | 7/1991 |

OTHER PUBLICATIONS

International Search Report for PCT US2008/064846; dated May 27, 2008; 4 pages.

*Primary Examiner* — Leonard R Leo
(74) *Attorney, Agent, or Firm* — Armstrong Teasdale LLP

(57) ABSTRACT

A method of assembling a syngas cooler is provided. The method includes coupling a supply line within a cooler shell, coupling a heat transfer panel within the cooler shell, and coupling a heat transfer enclosure within the cooler shell such that the heat transfer enclosure substantially isolates the heat transfer panel from the cooler shell. A manifold is coupled in flow communication with the supply line, the heat transfer enclosure, and the heat transfer panel.

13 Claims, 3 Drawing Sheets

(56) References Cited

U.S. PATENT DOCUMENTS

| | | | |
|---|---|---|---|
| 4,509,463 A | 4/1985 | Vollhardt et al. | |
| 4,513,694 A | 4/1985 | Wiemer | |
| 4,632,587 A * | 12/1986 | Vollhardt | 422/202 |
| 4,876,987 A | 10/1989 | Martin et al. | |
| 4,936,376 A | 6/1990 | Martin et al. | |
| 5,233,943 A | 8/1993 | Martin et al. | |
| 5,713,312 A | 2/1998 | Waryasz | |
| 6,189,605 B1 * | 2/2001 | Lameris | 165/163 |
| 2007/0119577 A1 | 5/2007 | Kraft et al. | |

* cited by examiner

METHOD AND APPARATUS FOR HEAT RECOVERY WITHIN A SYNGAS COOLER

BACKGROUND OF THE INVENTION

This invention relates generally to a syngas cooler, and, more particularly, to a heat recovery system for use with a syngas cooler.

At least some known syngas coolers include platens and a tube wall to facilitate heat transfer from a syngas flow to a fluid flowing within the platens and/or tube wall. The platens in such syngas coolers are circumscribed by the tube wall. Known tube walls are designed to be gas-tight such that the syngas is effectively retained within the tube wall. As such the syngas contacts the tube wall rather than an outer shell of the cooler. Generally, the cooler outer shells are not as thermally tolerant as the tube wall.

As least some known syngas coolers include a plurality of platen supply lines and a plurality of separate tube wall supply lines that are each coupled between the tube wall and the outer shell. The platen supply lines couple to a platen lower manifold. The tube wall supply lines are each coupled to a separate tube wall lower manifold such that the platens and the tube wall are supplied with heat transfer fluid through respective manifolds. In at least some known syngas coolers, the platen lower manifold is positioned upstream and radially inward from the tube wall lower manifold. In such coolers, the platen supply lines must pass through the tube wall to be coupled to the platen lower manifold. Unfortunately, such penetrations through the tube wall may undesirably allow heated syngas to flow through the tube wall and contact the outer shell, which may induce thermal stresses and/or premature wear to the outer shell of the cooler. To facilitate reducing syngas leakage, at least some known syngas coolers include a seal coupled between the platen supply line and the tube wall where each supply line passes through the tube wall. However, such seals may leak and allow heated syngas to escape from the tube wall.

BRIEF DESCRIPTION OF THE INVENTION

In one aspect, a method of assembling a syngas cooler is provided. The method includes coupling a supply line within a cooler shell, coupling a heat transfer panel within the cooler shell, and coupling a heat transfer enclosure within the cooler shell such that the heat transfer enclosure substantially isolates the heat transfer panel from the cooler shell. A manifold is coupled in flow communication with the supply line, the heat transfer enclosure, and the heat transfer panel.

In another aspect, a manifold for use with a syngas cooler is provided. The manifold includes a first outlet configured to be coupled in flow communication with a heat transfer enclosure coupled within the syngas cooler. The heat transfer enclosure is configured to substantially encase a flow of heated gas through the syngas cooler. The manifold further includes a second outlet configured to be coupled in flow communication with a heat transfer panel coupled within the syngas cooler, and an inlet configured to be coupled in flow communication with a heat transfer medium supply line that extends through the syngas cooler.

In a still further aspect, a heat recovery system for use with a gasifier system is provided. The heat recovery system includes a supply line configured to channel a heat transfer medium into the heat recovery system, and a heat transfer enclosure including a plurality of circumferentially-spaced tubes. The heat transfer enclosure is configured to substantially encase a flow of heated gas through the gasifier system. The heat recovery system further includes a heat transfer panel including a plurality of tubes, and an annular manifold. The annular manifold includes a first outlet coupled in flow communication with the heat transfer enclosure, a second outlet coupled in flow communication with the heat transfer panel, and an inlet coupled in flow communication with the supply line such that the heat transfer medium is channeled from the supply line to the heat transfer enclosure and the heat transfer panel via the manifold.

DETAILED DESCRIPTION OF THE INVENTION

Figure 1:
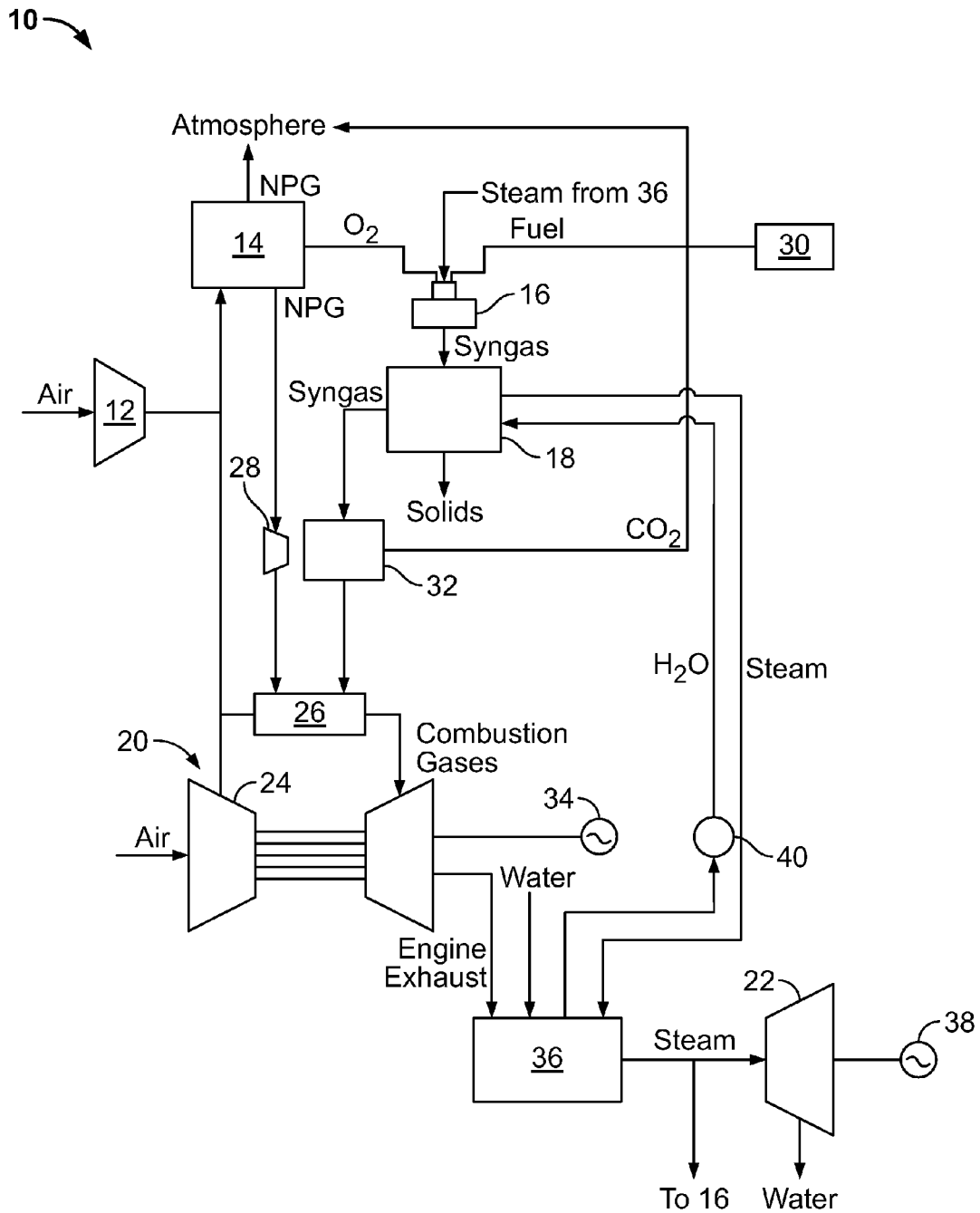
FIG. 1 is schematic view of an exemplary integrated gasification combined cycle system.

FIG. 1 is a schematic diagram of an exemplary integrated gasification combined-cycle (IGCC) power generation system 10. IGCC system 10 generally includes a main air compressor 12, an air separation unit (ASU) 14 coupled in flow communication to compressor 12, a gasifier 16 coupled in flow communication to ASU 14, a syngas cooler 18 coupled in flow communication to gasifier 16, a gas turbine engine 20 coupled in flow communication to syngas cooler 18, and a steam turbine 22 coupled in flow communication to syngas cooler 18.

In operation, compressor 12 compresses ambient air that is then channeled to ASU 14. In the exemplary embodiment, in addition to compressed air from compressor 12, compressed air from a gas turbine engine compressor 24 is supplied to ASU 14. Alternatively, compressed air from gas turbine engine compressor 24 is supplied to ASU 14, rather than compressed air from compressor 12 being supplied to ASU 14. In the exemplary embodiment, ASU 14 uses the compressed air to generate oxygen for use by gasifier 16. More specifically, ASU 14 separates the compressed air into separate flows of oxygen ($O_2$) and a gas by-product, sometimes referred to as a "process gas". The $O_2$ flow is channeled to gasifier 16 for use in generating partially combusted gases, referred to herein as "syngas" for use by gas turbine engine 20 as fuel, as described below in more detail.

The process gas generated by ASU 14 includes nitrogen and will be referred to herein as "nitrogen process gas" (NPG). The NPG may also include other gases such as, but not limited to, oxygen and/or argon. For example, in the exemplary embodiment, the NPG includes between about 95% and about 100% nitrogen. In the exemplary embodiment, at least some of the NPG flow is vented to the atmosphere from ASU 14, and at some of the NPG flow is injected into a combustion zone (not shown) within a gas turbine engine combustor 26 to facilitate controlling emissions of engine 20, and more specifically to facilitate reducing the combustion temperature and reducing nitrous oxide emissions from engine 20. In the exemplary embodiment, IGCC system 10 includes a compressor 28 for compressing the nitrogen process gas flow before being injected into the combustion zone of gas turbine engine combustor 26.

In the exemplary embodiment, gasifier 16 converts a mixture of fuel supplied from a fuel supply 30, $O_2$ supplied by ASU 14, steam, and/or limestone into an output of syngas for use by gas turbine engine 20 as fuel. Although gasifier 16 may use any fuel, gasifier 16, in the exemplary embodiment, uses coal, petroleum coke, residual oil, oil emulsions, tar sands, and/or other similar fuels. Furthermore, in the exemplary embodiment, the syngas generated by gasifier 16 includes carbon dioxide.

In the exemplary embodiment, syngas generated by gasifier 16 is channeled to syngas cooler 18 to facilitate cooling the syngas, as described in more detail below. The cooled syngas is channeled from cooler 18 to a clean-up device 32 for cleaning the syngas before it is channeled to gas turbine engine combustor 26 for combustion thereof. Carbon dioxide ($CO_2$) may be separated from the syngas during clean-up and, in the exemplary embodiment, may be vented to the atmosphere. Gas turbine engine 20 drives a generator 34 that supplies electrical power to a power grid (not shown). Exhaust gases from gas turbine engine 20 are channeled to a heat recovery steam generator 36 that generates steam for driving steam turbine 22. Power generated by steam turbine 22 drives an electrical generator 38 that provides electrical power to the power grid. In the exemplary embodiment, steam from heat recovery steam generator 36 is supplied to gasifier 16 for generating syngas.

Furthermore, in the exemplary embodiment, system 10 includes a pump 40 that supplies boiled water from steam generator 36 to syngas cooler 18 to facilitate cooling the syngas channeled from gasifier 16. The boiled water is channeled through syngas cooler 18 wherein the water is converted to steam. The steam from cooler 18 is then returned to steam generator 36 for use within gasifier 16, syngas cooler 18, and/or steam turbine 22.

Figure 2:
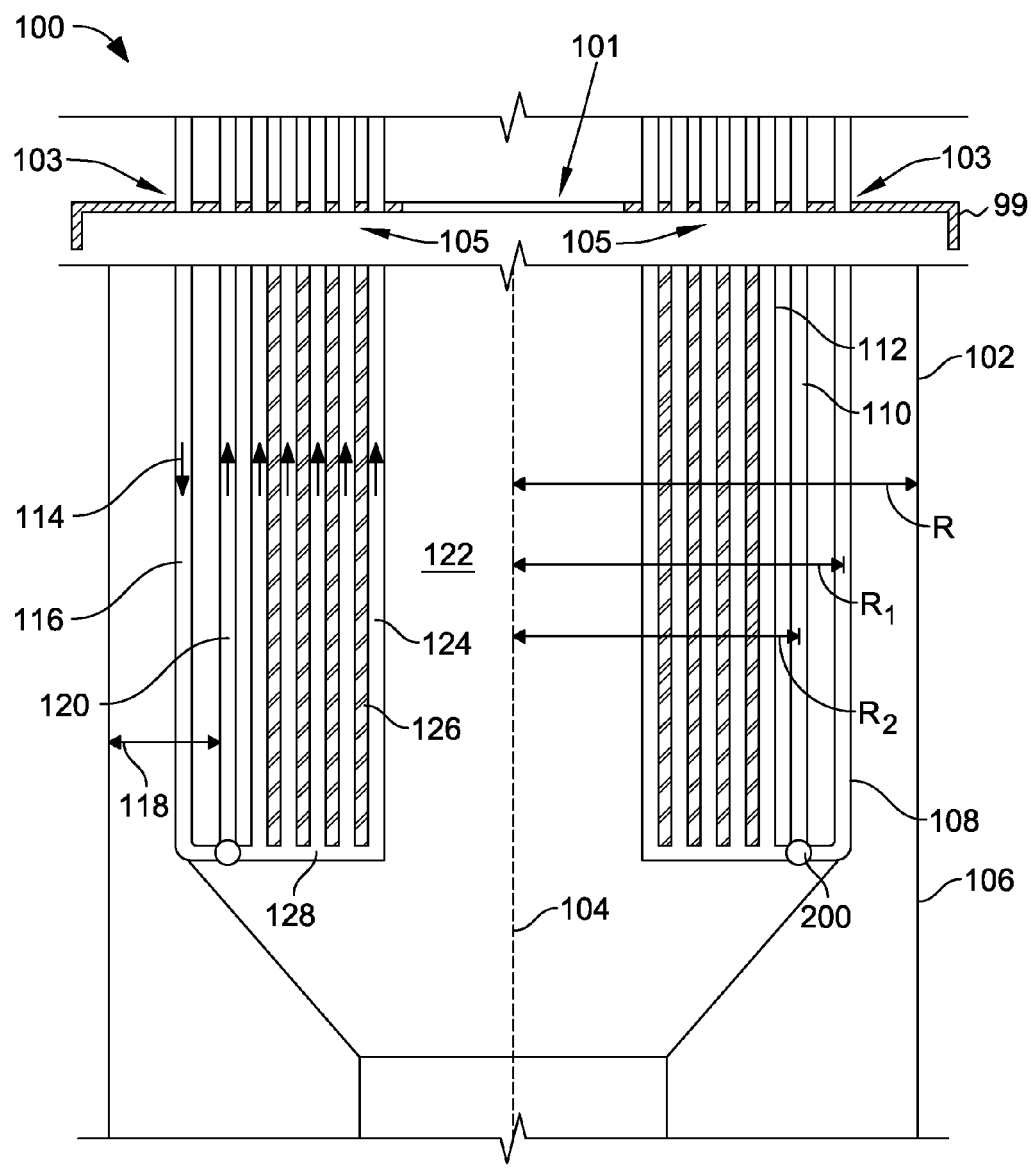
FIG. 2 is a schematic cross-sectional view of an exemplary syngas cooler that may be used with the system shown in FIG. 1.

FIG. 2 shows a schematic cross-sectional view of an exemplary syngas cooler 100 that may be used with system 10. In the exemplary embodiment, syngas cooler 100 is a radiant syngas cooler. Syngas cooler 100 includes a pressure vessel shell 102 having a top opening 101 and a bottom opening (not shown) that are generally concentrically aligned with each other along a cooler centerline 104. As referred to herein, an "axial" direction is a direction that is substantially parallel to centerline 104, an "upward" direction is a direction that is generally towards the top opening, and a "downward" direction is a direction that is generally towards the bottom opening. Syngas cooler 100 has a radius R measured from centerline 104 to an outer surface 106 of shell 102. Furthermore, in the exemplary embodiment, a top 99 of cooler 100 includes a plurality of downcomer openings 103 and a plurality of riser openings 105 that circumscribe the top opening. In the exemplary embodiment, shell 102 is fabricated from a pressure vessel quality steel, such as, but not limited to, a chromium molybdenum steel. As such, shell 102 is facilitated to withstand the operating pressures of syngas flowing through syngas cooler 100. Moreover, in the exemplary embodiment, the shell top opening is coupled in flow communication with gasifier 16 for receiving syngas discharged from gasifier 16. The bottom opening of shell 102, in the exemplary embodiment, is coupled in flow communication with a slag collection unit (not shown) to enable the collection of solid particles formed during gasification and/or cooling.

Within shell 102, in the exemplary embodiment, are a plurality of heat transfer medium supply lines (also referred to herein as "downcomers") 108, a heat transfer wall (also referred to herein as a "tube wall") 110, and a plurality of heat transfer panels (also referred to herein as "platens") 112. More specifically, in the exemplary embodiment, downcomers 108 are positioned radially inward of shell 102, tube wall 110 is radially inward of downcomers 108, and platens 112 are arranged within tube wall 110 such that tube wall 110 substantially circumscribes platens 112 or otherwise substantially encases platens 112. Generally, in the exemplary embodiment, downcomers 108 are located at a radius $R_1$ outward from centerline 104, and tube wall 110 is located at a radius $R_2$ from centerline 104, wherein radius $R_1$ is longer than radius $R_2$ and radius R is longer than radii $R_1$ and $R_2$. Alternatively, shell 102, downcomers 108, tube wall 110, and/or platens 112 are arranged in other orientations.

In the exemplary embodiment, downcomers 108 supply a heat transfer medium 114, such as, for example, water from steam generator 36, to syngas cooler 100, as described herein. More specifically, downcomers 108 supply heat transfer medium 114 to tube wall 110 and platens 112 via a lower manifold 200, as is described in more detail below. Lower manifold 200, in the exemplary embodiment, is coupled proximate to the cooler bottom opening, and, as such, is downstream from the cooler top opening through which syngas enters cooler 100. In the exemplary embodiment, downcomers 108 include tubes 116 fabricated from a material that enables cooler 100 and/or system 10 to function as described herein. Furthermore, in the exemplary embodiment, a gap 118 defined between shell 102 and tube wall 110 may be pressurized to facilitate decreasing stresses induced to tube wall 110.

In the exemplary embodiment, tube wall 110 includes a plurality of circumferentially-spaced, axially-aligned tubes 120 coupled together with a membrane (also referred to herein as a "web") (not shown). Although in the exemplary embodiment, tube wall 110 includes only one row of tubes 120, in other embodiments, tube wall 110 may include more than one row of tubes 120. More specifically, in the exemplary embodiment, the membrane and tubes 120 are coupled together such that tube wall 110 is substantially impermeable to syngas. As such, tube wall 110 substantially retains the syngas in an inner portion 122 of cooler 100 that is effectively isolated from downcomers 108 and/or shell 102. As such, tube wall 110 forms an enclosure through which syngas may flow. In the exemplary embodiment, heat is transferred from the syngas retained within tube wall 110 to heat transfer medium 114 flowing through tubes 120. Tubes 120 and/or the membrane are fabricated from a material having heat transfer properties that enable cooler 100 to function as described herein. Furthermore, in the exemplary embodiment, tube wall 110 is coupled to risers extending through the top of shell 102 (not shown) such that the heated heat transfer medium 114 may be channeled from cooler 100 to, for example, heat recovery steam generator 36 (shown in FIG. 1).

In the exemplary embodiment, platens 112 each include a plurality of tubes 124 coupled together with a membrane 126. Each platen 112 may include any number of tubes 124 that enables cooler 100 to function as described herein. Although platens 112 are shown in FIG. 2 as being oriented generally radially with generally axially-aligned tubes 124, platens 112 and/or tubes 124 may be oriented and/or configured in any suitable orientation and/or configuration that enables cooler 100 to function as described herein. In the exemplary embodiment, platen tubes 124 are each coupled to a lower inlet tube 128 and to an upper outlet tube (not shown). More specifically, in the exemplary embodiment, tubes 124 are aligned substantially perpendicular to lower inlet tube 128 such that tubes 124 extend from lower inlet tube 128 in an array. Alternatively, tubes 124 may be oriented ay any angle with respect to tube 128 and/or may be arranged in a different array from lower inlet tube 128.

Figure 3:
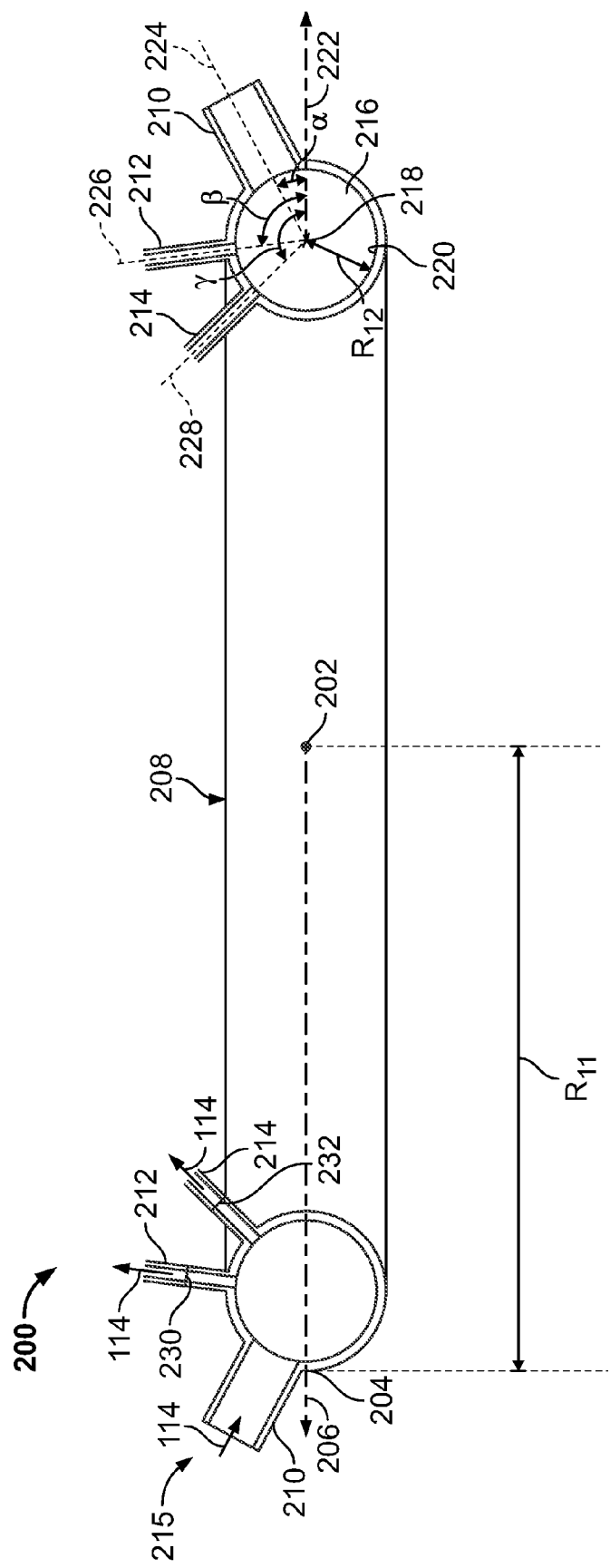
FIG. 3 is a cross-sectional view of an exemplary lower manifold that may be used with the syngas cooler shown in FIG. 2.

FIG. 3 is a cross-sectional view of an exemplary lower manifold 200 that may be used with syngas cooler 100 (shown in FIG. 2). Manifold 200 has a radius $R_{11}$ measured from a manifold center point 202 to an outer surface 204 of manifold 200. In the exemplary embodiment, manifold 200 includes an annular ring portion 208, a downcomer inlet 210, a tube wall outlet 212, and a platen outlet 214. More specifically, in the exemplary embodiment, downcomer inlet 210 is coupled to downcomer 108 (shown in FIG. 2), tube wall outlet 212 is coupled to tube wall 110 (shown in FIG. 2), and platen outlet 214 is coupled to platen 112 (shown in FIG. 2). Although FIG. 3 shows only two downcomer inlets 210, two tube wall outlets 212, and two platen outlets 214 spaced about manifold 200, manifold 200 may include more or less than two downcomer inlets 210, more or less than two tube wall outlets 212, and/or more or less than two platen outlets 214.

Furthermore, in the exemplary embodiment, the number of downcomer inlets 210, the number of tube wall outlets 212, and the number of platen outlets 214 are equal. Alternatively, the number of downcomer inlets 210, the number of tube wall outlets 212, and/or the number of platen outlets 214 may be different. In one embodiment, the number of downcomer inlets 210, tube wall outlets 212, and platen outlets 214 is equal to the number of platens 112 (shown in FIG. 2) within cooler 100. Moreover, in the exemplary embodiment, downcomer inlet 210, tube wall outlet 212, and platen outlet 214 are generally aligned in the same radial direction 206 such that downcomer inlet 210, tube wall outlet 212, and platen outlet 214 are arranged in a band 215 about annular ring portion 208. Alternatively, downcomer inlet 210, tube wall outlet 212, and platen outlet 214 may be oriented in other alignments. For example, in an alternative embodiment, downcomer inlet 210 may be circumferentially-offset from tube wall outlet 212 and/or platen outlet 214.

In the exemplary embodiment, annular ring portion 208 includes a chamber 216 having a radius $R_{12}$ measured from a chamber center point 218 and an annular ring portion inner surface 220. In the exemplary embodiment, chamber 216 receives heat transfer medium 114 discharged from downcomer inlet 210. Further, in the exemplary embodiment, chamber 216 extends continuously within annular ring portion 208 such that chamber 216 is in fluid communication with each downcomer inlet 210, each tube wall outlet 212, and/or each platen outlet 214. Alternatively, chamber 216 may be divided into a plurality of sub-chambers (not shown).

In the exemplary embodiment, downcomer inlet 210 includes a substantially straight centerline 224 that extends radially outwardly from center point 218. In an alternative embodiment, downcomer inlet centerline 224 may be non-linear. For example, in one embodiment, centerline 224 may be arcuate such that inlet 210 is arcuate. Alternatively, depending on the design of manifold 200, centerline 224 may extend from a different point (not shown) such that centerline 224 is offset from center point 218. In the exemplary embodiment, downcomer inlet 210 is aligned with respect to annular ring 208 such that downcomer inlet 210 is oriented at, but is not limited to being oriented at, an angle α between approximately 0° and approximately 180°, and more specifically, between approximately 0° and approximately 90°, wherein angle α is measured counter-clockwise from chamber radial direction 222 towards centerline 224. Alternatively, downcomer inlet 210 may be oriented at any orientation that enables cooler 100 and/or manifold 200 to function as described herein. Furthermore, in an alternative embodiment, manifold 200 includes a plurality of downcomer inlets 210 that area circumferentially-spaced about annular ring portion 208 along the same manifold radial direction 206.

In the exemplary embodiment, tube wall outlet 212 has a substantially straight centerline 226 that extends radially outwardly from center point 218. Alternatively, tube wall outlet centerline 226 may be non-linear. For example, in one embodiment, tube wall outlet centerline 226 may be arcuate such that outlet 212 is arcuate. Further, centerline 226 may extend from a different point (not shown) such that centerline 226 is offset from center point 218. In the exemplary embodiment, tube wall outlet 212 is aligned with respect to annular ring 208 such that tube wall outlet 212 is oriented at, but is not limited to being oriented at, an angle β between approximately 0° and approximately 180°, and more specifically, between approximately 108° and approximately 170°, wherein angle β is measured counter-clockwise from chamber radial direction 222 towards outlet centerline 226. Alternatively, tube wall outlet 212 may be oriented at any orientation that enables cooler 100 and/or manifold 200 to function as described herein. Furthermore, in an alternative embodiment, manifold 200 includes a plurality of tube wall outlets 212 that are circumferentially-spaced about annular ring portion 208 along the same manifold radial direction 206.

In the exemplary embodiment, platen outlet 214 has a substantially straight centerline 228 that extends radially outwardly from center point 218. Alternatively, platen outlet centerline 228 may be other than straight. For example, in one embodiment, platen outlet centerline 228 may be arcuate such that outlet 214 is arcuate. Further, centerline 228 may extend from a different point (not shown) such that centerline 228 is offset from center point 218. In the exemplary embodiment, platen outlet 214 is aligned with respect to annular ring 208 such that platen outlet 214 is oriented at, but is not limited to being oriented at, an angle γ between approximately 0° and approximately 180°, and more specifically, between angle β and approximately 170°, wherein angle γ is measured counter-clockwise from chamber radial direction 222 towards platen outlet centerline 228. More specifically, platen outlet 214 is oriented such that tube wall outlet 212 is circumferentially-spaced between downcomer inlet 210 and platen outlet 214. In one embodiment, platen outlet 214 is spaced approximately 18° from tube wall outlet 212. Alternatively, platen outlet 214 may be at any orientation that enables cooler 100 and/or manifold 200 to function as described herein. Furthermore, in an alternative embodiment, manifold 200 includes a plurality of platen outlets 214 that are circumferentially-spaced about annular ring portion 208 with respect to radius $R_{12}$ along the same manifold radial direction 206.

In the exemplary embodiment, tube wall outlet 212 includes an orifice 230, and platen outlet 214 includes an orifice 232. Alternatively, either tube wall outlet 212 and/or platen outlet 214 does not include an orifice. In the exemplary embodiment, orifices 230 and 232 facilitate balancing and/or equalizing the flow of heat transfer medium 114 through tube wall 110 and/or platens 112. For example, orifices 230 and 232 facilitate balancing and/or equalizing heat transfer medium pressure, mass flow rate, and/or any fluid characteristic of heat transfer medium 114 that enables cooler 100 and/or manifold 200 to function as described herein.

During operation of cooler 100, heat transfer medium 114 enters cooler 100 through downcomers 108 extending through the top portion of cooler 100. More specifically, in the exemplary embodiment, water from steam generator 36 is channeled to downcomers 108 for use within cooler 100. The heat transfer medium 114, in the exemplary embodiment, is discharged from downcomers 108 into manifold 200 through downcomer inlets 210. The heat transfer medium 114 is supplied to tube wall 110 and platens 112 via manifold 200. More specifically, in the exemplary embodiment, the heat transfer medium 114 is discharged through tube wall outlets 212 and platen outlets 214 into tube wall 110 and platens 112, respectively. As the heat transfer medium 114 flows through outlets 212 and 214 orifices 230 and 232 facilitate regulating the flow of heat transfer medium 114 into tube wall 110 and platens 112, respectively.

In the exemplary embodiment, syngas is discharged into cooler 100 from gasifier 16. The flow of syngas through cooler 100 is retained within inner portion 122 of cooler 100 by tube wall 110. The heat of syngas within tube wall 110 is transferred to heat transfer medium 114 with tube wall tubes 120 and platen tubes 124 to heat the heat transfer medium 114 and to facilitate cooling the syngas. More specifically, in the exemplary embodiment, the heat from the syngas heats water flowing through tubes 120 and/or 124 such that the water is converted to steam as it flows through tube wall 110 and/or platens 112, and the syngas is cooled as it flows through cooler 100. Further, in the exemplary embodiment, heated heat transfer medium 114 is discharged from tube wall 110 and platens 112 into risers, which channels the heated heat transfer medium 114 out of cooler 100. In the exemplary embodiment, the heat transfer medium 114 is channeled through risers to steam generator 36 for use within gasifier 16, syngas cooler 100, and/or steam turbine 22.

The above-described methods and apparatus facilitate supplying a heat transfer medium to a syngas cooler such that the syngas is effectively isolated from the syngas cooler shell. By reducing penetrations through a tube wall within the syngas cooler, the above-described lower manifold facilitates reducing leaks of syngas through the tube wall. More specifically, by coupling the downcomers to a single lower manifold for both the tube wall and the platens, penetrations through the tube wall are facilitated to be reduced as compared to tube walls that include openings for downcomers to pass through for coupling to a separate platen lower manifold. Furthermore, by reducing the number of openings extending through the tube wall, seals at the openings are also facilitated to be reduced. As such, the above-described manifold facilitates reducing components within the syngas cooler, which facilitates reducing the cost of the syngas cooler, as compared to syngas coolers that include seals within the tube wall.

The above-described manifold further facilitates reducing components within the syngas cooler by facilitating the elimination of multiple lower manifolds. More specifically, by using the above-describe manifold within a syngas cooler, the syngas cooler is facilitated to be simplified because the platen lower manifold and the tube wall lower manifold are the same component—namely, the above-described manifold. As such, syngas cooler components, such as, for example, manifolds, seals, and/or downcomers, are facilitated to be reduced within syngas cooler as compared to syngas coolers that include separate lower manifolds for the tube wall and the platens. Such reduction of components facilitates reducing cost and complexity of the syngas cooler, while facilitating increasing the serviceability of the syngas cooler.

Exemplary embodiments of a method and apparatus for recovering heat within a syngas cooler are described above in detail. The method and apparatus are not limited to the specific embodiments described herein, but rather, components of the method and apparatus may be utilized independently and separately from other components described herein. For example, the lower manifold may also be used in combination with other heat transfer systems and methods, and is not limited to practice with only the syngas cooler as described herein. Rather, the present invention can be implemented and utilized in connection with many other heat transfer applications.

While the invention has been described in terms of various specific embodiments, those skilled in the art will recognize that the invention can be practiced with modification within the spirit and scope of the claims.

What is claimed is:

1. A method of assembling a syngas cooler, said method comprising:
   coupling a supply line within a cooler shell;
   coupling a plurality of heat transfer panels within the cooler shell, wherein each of the plurality of heat transfer panels includes a plurality of tubes coupled together with a membrane;
   coupling a heat transfer enclosure within the cooler shell such that the heat transfer enclosure substantially encircles and isolates the plurality of heat transfer panels from the cooler shell;
   positioning a manifold that includes an annular ring portion, a plurality of first outlets, a plurality of second outlets, and a plurality of inlets such that each first outlet is circumferentially spaced between a corresponding one of the inlets and a corresponding one of the second outlets, wherein the number of the first outlets, the number of second outlets, and the number of inlets are equal;
   coupling each of the first outlets in flow communication with the heat transfer enclosure;
   coupling each second outlet in flow communication with a corresponding one of the plurality of heat transfer panels, by coupling a common lower inlet tube of the heat transfer panel to each of the plurality of tubes of the heat transfer panel and to the second outlet; and
   coupling each of the inlets in flow communication with the supply line.

2. A method in accordance with claim 1 wherein positioning a manifold further comprises using a manifold that includes a continuous annular chamber.

3. A method in accordance with claim 1 wherein coupling the plurality of heat transfer panels within the cooler shell further comprises coupling the plurality of heat transfer panels within the heat transfer enclosure.

4. A syngas cooler, comprising:
   a manifold comprising:
   an annular ring portion;
   a plurality of first outlets configured to be coupled in flow communication with a heat transfer enclosure coupled within the syngas cooler, the heat transfer enclosure configured to substantially encase a flow of heated gas through the syngas cooler;
   a plurality of second outlets, each second outlet configured to be coupled in flow communication with a corresponding one of a plurality of heat transfer panels coupled within the syngas cooler, wherein each heat transfer panel comprises a plurality of tubes coupled together with a membrane, and wherein the heat transfer enclosure-substantially encircles and isolates the heat transfer panels from the cooler shell;
   a plurality of common lower inlet tubes, each common lower inlet tube coupled to each of the plurality of tubes of a corresponding one of the heat transfer panels and to a corresponding one of the second outlets;
   a plurality of inlets configured to be coupled in flow communication with a plurality of heat transfer medium supply lines that extend through the syngas cooler, each first outlet is circumferentially spaced between a corresponding one of the inlets and a corresponding one of the second outlets, wherein the number of first outlets, the number of second outlets, and the number of inlets are equal.

5. A syngas cooler in accordance with claim 4, wherein said annular ring portion comprises a continuous chamber.

6. A syngas cooler in accordance with claim 4 wherein each of said first outlets comprises a first orifice defined therein and sized to regulate a fluid flow through said each first outlet.

7. A syngas cooler in accordance with claim 4 wherein each of said second outlets comprises a second orifice defined therein and sized to regulate a fluid flow through said each second outlet.

8. A syngas cooler in accordance with claim 4 further comprising a plurality of bands, wherein each band comprises a first outlet of said first outlets, a second outlet of said second outlets, and an inlet of said inlets.

9. A manifold in accordance with claim 4, wherein each said inlet is aligned with respect to said annular ring portion at an angle of between approximately 0° and approximately 90°.

10. A manifold in accordance with claim 4, wherein each said first outlet is aligned with respect to said annular ring portion at an angle of between 108° and approximately 170°.

11. A heat recovery system for use with a gasifier system, said heat recovery system comprising:
a cooler shell;
a plurality of supply lines configured to channel a heat transfer medium into said heat recovery system;
a heat transfer enclosure-comprising a plurality of circumferentially-spaced tubes, said heat transfer enclosure configured to substantially encase a flow of heated gas through the gasifier system;
a plurality of heat transfer panels, each heat transfer panel comprising a plurality of tubes coupled together with a membrane, wherein the heat transfer enclosure substantially encircles and isolates the heat transfer panels from the cooler shell; and
an annular manifold comprising:
an annular ring portion;
a plurality of first outlets coupled in flow communication with said heat transfer enclosure;
a plurality of second outlets, each second outlet coupled in flow communication with a corresponding one of said heat transfer panels;
a plurality of inlets coupled in flow communication with said supply lines such that the heat transfer medium is channeled from said supply lines to said heat transfer enclosure and said heat transfer panels via said manifold, and such that each said first outlet is circumferentially spaced between a corresponding one of said inlets and a corresponding one of said second outlets, wherein the number of said first outlets, the number of said second outlets, and the number of said inlets are equal; and
a plurality of common lower inlet tubes, each common lower inlet tube coupled to each of the plurality of tubes of a corresponding one of the heat transfer panels and to a corresponding one of the second outlets.

12. A heat recovery system in accordance with claim 11 wherein said manifold further comprises a plurality of bands, wherein each band comprises one of said plurality of first outlets, one of said plurality of second outlets, and one of said plurality of inlets.

13. A heat recovery system in accordance with claim 12 wherein said plurality of bands are circumferentially-spaced about said manifold.

* * * * *